(12) United States Patent
Shiau et al.

(10) Patent No.: US 11,852,859 B2
(45) Date of Patent: Dec. 26, 2023

(54) LIGHT SOURCE MODULE AND DISPLAY DEVICE

(71) Applicant: Coretronic Corporation, Hsin-Chu (TW)

(72) Inventors: Tzeng-Ke Shiau, Hsin-Chu (TW); Yi-Cheng Lin, Hsin-Chu (TW); Chia-Liang Kang, Hsin-Chu (TW); Shih-Wei Liu, Hsin-Chu (TW); Wei-Chun Yang, Hsin-Chu (TW); Cheng-Yi Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/112,511

(22) Filed: Feb. 22, 2023

(65) Prior Publication Data

US 2023/0280521 A1 Sep. 7, 2023

(30) Foreign Application Priority Data

Mar. 7, 2022 (CN) .......................... 202220474686.8

(51) Int. Cl.
*F21V 8/00* (2006.01)

(52) U.S. Cl.
CPC ......... *G02B 6/0043* (2013.01); *G02B 6/0053* (2013.01)

(58) Field of Classification Search
CPC ............................ G02B 6/0043; G02B 6/0053
See application file for complete search history.

(56) References Cited

U.S. PATENT DOCUMENTS

| 2010/0135041 A1* | 6/2010 | Niu ...................... | G02B 6/0036 |
| | | | 250/504 R |
| 2013/0329432 A1* | 12/2013 | Parker .................. | G02B 6/0018 |
| | | | 362/257 |

FOREIGN PATENT DOCUMENTS

| CN | 101329423 A | 12/2008 | |
| CN | 207704062 U | 8/2018 | |
| TW | 201227079 A1 | 7/2012 | |
| TW | 201939132 A | 10/2019 | |
| WO | WO-2012092465 A1 * | 7/2012 | ........... G02B 5/0252 |

* cited by examiner

*Primary Examiner* — Karabi Guharay

(57) ABSTRACT

A light source module includes a light guide plate, a light-emitting element, and first and second prism sheets. One of the light-emitting surface and the bottom surface of the light guide plate has strip-shaped microstructures. The bottom surface has bottom microstructures, and the angle between the first surface of each bottom microstructure and the bottom surface is 1° to 17°. The first prism sheet is disposed on the light-emitting surface and between the light-emitting surface and the second prism sheet and includes first prism rods. The second prism sheet includes second prism rods. The aspect ratio of the strip-shaped microstructure is greater than 0.2. The angle between the maximum luminance direction of the light from the light-emitting surface and the normal direction of the light-emitting surface is less than 70°. The light-emitting angle range is less than 40°. A display device including the light source module is also provided.

10 Claims, 10 Drawing Sheets

LIGHT SOURCE MODULE AND DISPLAY DEVICE

CROSS-REFERENCE TO RELATED APPLICATION

This application claims the priority benefit of China application No. 202220474686.8, filed on Mar. 7, 2022. The entirety of the above-mentioned patent application is hereby incorporated by reference herein and made a part of this specification.

FIELD OF THE INVENTION

The present invention relates to a light source module, and more particularly to a light source module suitable for a display device, and a display device having the light source module.

BACKGROUND OF THE INVENTION

The liquid crystal display includes a light source module, a display panel, outer frames and other components. Backlight modules can be divided into edge-type backlight modules and direct-type backlight modules. In the edge-type light source module, the light-emitting element is disposed on a side of the light guide plate, and the light guide plate guides the light emitted by the light-emitting element to the light-emitting surface of the light guide plate, thereby forming a surface light source.

However, most of the surface light sources of edge-type light source modules have some problems, such as the viewing angle range is large and the forward luminance is insufficient (the angle between the reflection surface of the microstructure on the bottom of the light guide plate and the bottom surface is a large angle) or the viewing angle range is small but the maximum luminance deviates from the normal direction (the angle between the reflection surface of the microstructure on the bottom surface of the light guide plate and the bottom surface is a small angle), which may cause the image quality of the liquid crystal display to be poor. The general solution to the above problems is to increase the quantity of light-emitting elements to increase the forward luminance, which leads to an increase in the power consumption of the backlight module, which does not conform to the trend of energy-saving design in recent years.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a light source module to improve forward luminance.

The present invention provides a display device to improve image quality.

Other advantages and objects of the invention may be further illustrated by the technical features broadly embodied and described as follows.

In order to achieve one or a portion of or all of the objects or other objects, the light source module provided by the present invention includes a light guide plate, a light-emitting element, a first prism sheet and a second prism sheet. The light guide plate has a light-incident surface, a light-emitting surface and a bottom surface. The light-emitting surface is opposite to the bottom surface. The light-incident surface is connected to the light-emitting surface and the bottom surface. At least one of the light-emitting surface and the bottom surface has a plurality of first strip-shaped microstructures. The first strip-shaped microstructures extend from the light-incident surface in a first extension direction away from the light-incident surface and are arranged in a first arrangement direction. The first extension direction is not parallel to the first arrangement direction. The bottom surface has a plurality of bottom microstructures. Each of the bottom microstructures has a first surface facing the light-incident surface. An acute angle between the first surface and the bottom surface ranges from 1° to 17°. The light-emitting element is disposed opposite to the light-incident surface of the light guide plate and configured to emit a light. The first prism sheet is disposed beside the light-emitting surface. The first prism sheet includes a plurality of first prism rods disposed on a side of the first prism sheet facing away from the light-emitting surface. The first prism rods extend in a second extension direction. An angle between the second extension direction and the light-incident surface ranges from 0° to 30°. The second prism sheet is disposed beside the light-emitting surface. The first prism sheet is further disposed between the light-emitting surface and the second prism sheet. The second prism sheet includes a plurality of second prism rods disposed on a side of the second prism sheet facing away from the light-emitting surface. The second prism rods extend in a third extension direction. An angle between the third extension direction and the light-incident surface ranges from 0° to 30°. A ratio of a height of the first strip-shaped microstructure in a direction perpendicular to the light-emitting surface to a width of the first strip-shaped microstructure in a direction parallel to the first arrangement direction is greater than or equal to 0.2. A light-emitting distribution of the light emitted from the light-emitting surface of the light guide plate has a maximum luminance direction. An angle between the maximum luminance direction and the normal direction of the light-emitting surface of the light guide plate is less than 70°. The light emitted from the second prism sheet has a backlight light-emitting distribution. The backlight light-emitting distribution has a light-emitting angle range in a direction perpendicular to the light-incident surface, and the light-emitting angle range is less than 40°.

In order to achieve one or a portion of or all of the objects or other objects, the display device provided by the present invention includes the aforementioned light source module and a display panel. The display panel is disposed on a light-emitting side of the light source module.

The light source module of the present invention adopts the light guide plate, the first prism sheet and the second prism sheet to adjust the angle of the exiting light. In detail, after the light generated by the light-emitting element enters the light guide plate, the aforementioned light can be output in a direction closer to the normal direction of the light-emitting surface of the light guide plate through adjusting the light path of the aforementioned light by the bottom microstructures and the first strip-shaped microstructures. In addition, after emitting from the light-emitting surface, the aforementioned light will be incident on the first prism sheet and the second prism sheet, and the light path of the aforementioned light can be further adjusted by the first prism rods of the first prism sheet and the second prism rods of the second prism sheet, so that the aforementioned light can be output in a direction closer to the normal direction of the light-emitting surface. Therefore, the light source module of the present invention can effectively improve the forward luminance, and the display device having the aforementioned light source module can also improve the image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
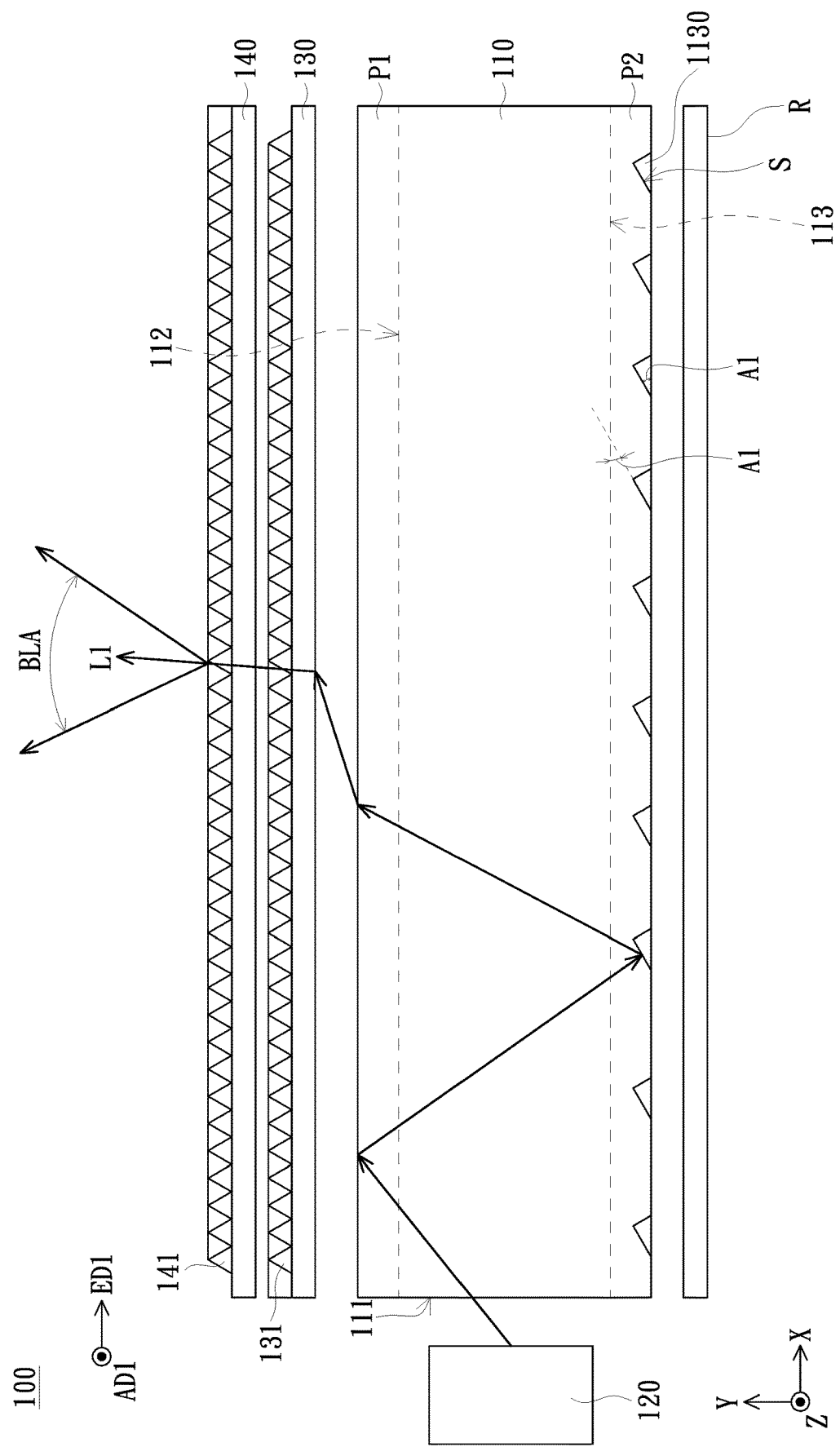
FIG. 1 is a schematic cross-sectional view of a light source module according to an embodiment of the present invention.
Figure 2:
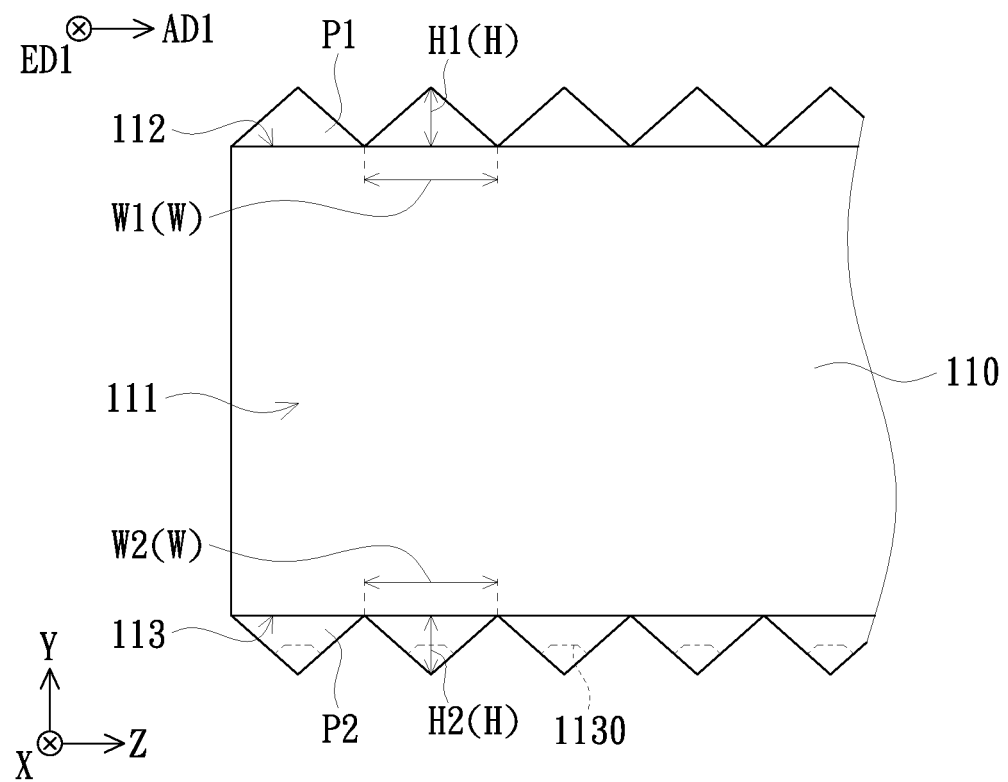
FIG. 2 is a partial enlarged schematic view of a light guide plate of the light source module of FIG. 1.
Figure 3:
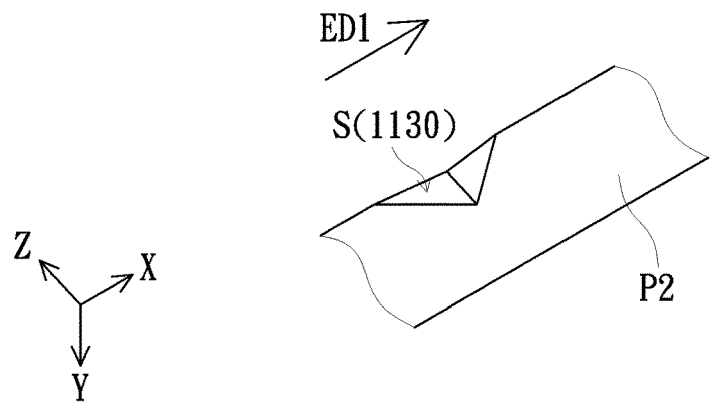
FIG. 3 is a schematic perspective view of a first strip-shaped microstructure of the light source module of FIG. 1.
Figure 4:
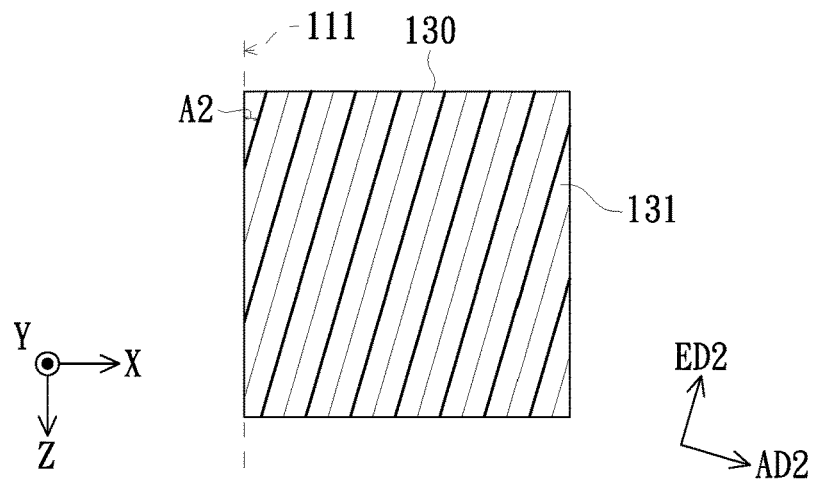
FIG. 4 is a schematic top view of a first prism sheet and a light-incident surface of the light guide plate of the light source module of FIG. 1.
Figure 5:
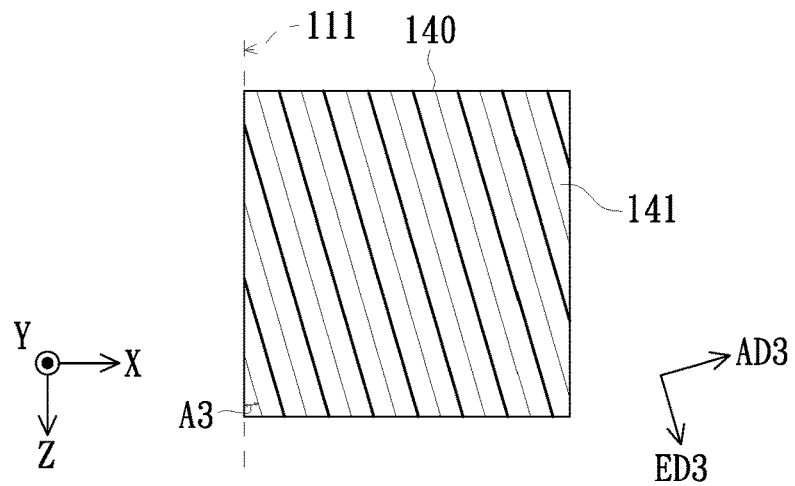
FIG. 5 is a schematic top view of a second prism sheet and the light-incident surface of the light guide plate of the light source module of FIG. 1.

FIG. 1 is a schematic cross-sectional view of a light source module according to an embodiment of the invention. FIG. 2 is a partial enlarged schematic side view of a light guide plate of the light source module of FIG. 1. FIG. 3 is a schematic perspective view of a first strip-shaped microstructure of the light source module of FIG. 1. FIG. 4 is a schematic top view of a first prism sheet and a light-incident surface of the light guide plate of the light source module of FIG. 1. FIG. 5 is a schematic top view of a second prism sheet and the light-incident surface of the light guide plate of the light source module of FIG. 1. FIGS. 1 to 5 illustrate the viewing angle relationship in directions X, Y and Z.

Please refer to FIGS. 1 and 2 first. The light source module 100 includes a light guide plate 110, a light-emitting element 120, a first prism sheet 130 and a second prism sheet 140. The light guide plate 110 has a light-incident surface 111, a light-emitting surface 112 and a bottom surface 113. The light-emitting surface 112 is opposite to the bottom surface 113, and the light-incident surface 111 is connected to the light-emitting surface 112 and the bottom surface 113, the light-emitting surface 112 is, for example, parallel to the bottom surface 113. At least one of the light-emitting surface 112 and the bottom surface 113 has a plurality of first strip-shaped microstructures. In this embodiment, the light-emitting surface 112 having a plurality of first strip-shaped microstructures P1 and the bottom surface 113 having a plurality of first strip-shaped microstructures P2 are taken as an example, and other features will be described in the embodiments in the following paragraphs. The first strip-shaped microstructures P1 and P2 extend from one side of the light-incident surface 111 in a first extension direction ED1 (also labeled in FIG. 3) away from the light-incident surface 111 and are arranged in a first arrangement direction AD1. The first extension direction ED1 is not parallel to the first arrangement direction AD1. In this embodiment, for example, the light-incident surface 111 is parallel to the direction Y and the direction Z, the first extension direction ED1 is substantially parallel to the direction X, the first arrangement direction AD1 is substantially parallel to the direction Z, the first extension direction ED1 and the first arrangement direction AD1 may be substantially perpendicular to each other, and the direction perpendicular to the light-emitting surface 112 may be substantially parallel to the direction Y, but the invention is not limited thereto. In this embodiment, the ratio (H/W) of the height H of each of the first strip-shaped microstructures P1 and P2 in the direction perpendicular to the light-emitting surface 112 (i.e., the direction Y) to the width W of each of the first strip-shaped microstructures P1 and P2 in the direction parallel to the first arrangement direction AD1 (i.e., the direction Z) is greater than or equal to 0.2. Specifically, each of the first strip-shaped microstructures P1 disposed on the light-emitting surface 112 has a height H1 and a width W1, each of the first strip-shaped microstructures P2 disposed on the bottom surface 113 has a height H2 and a width W2, and H1, W1, H2 and W2 can meet any one of the following groups of conditions:

1. H1/W1≥0.2 (only the first strip-shaped microstructures P1 are disposed), H2/W2≥0.2 (only the first strip-shaped microstructures P2 are disposed), or H1/W1+H2/W2≥0.2 (both of the first strip-shaped microstructures P1 and P2 are disposed);
2. H1/W1≥0.24, H2/W2≥0.24, or H1/W1+H2/W2≥0.24;
3. H1/W1≥0.24, H2/W2≥0.24, or H1/W1+H2/W2≥0.3;
4. H1/W1≥0.3, H2/W2≥0.3, or H1/W1+H2/W2≥0.35;
5. H1/W1≥0.4, H2/W2≥0.4, or H1/W1+H2/W2≥0.4.

Please refer to FIGS. 1 and 3. The bottom surface 113 of this embodiment has a plurality of bottom microstructures 1130, the bottom microstructures 1130 are, for example, recessed structures. Each of the bottom microstructures 1130 has a first surface S facing the light-incident surface 111 to reflect (for example, total internal reflection) the light emitted by the light-emitting element 120 toward the light-emitting surface 112. The included angle A1 (acute angle) between the first surface S and the bottom surface 113 (extending along the X-Z plane) ranges from 1° to 17°. For example, the included angle A1 of this embodiment may range from 3° to 17°. The included angle A1 of other embodiments may range from 3° to 15° or 3° to 12°. The light-emitting element 120 of this embodiment is disposed opposite to the light-incident surface 111 of the light guide plate 110 and is configured to emit light (e.g., the light has a light-emitting angle range BLA as shown in FIG. 1 and the light-emitting angle distribution L as shown in FIG. 6).

Please refer to FIGS. 1 and 4. The first prism sheet 130 is disposed beside the light-emitting surface 112. The first prism sheet 130 includes a plurality of first prism rods 131 disposed on the side of the first prism sheet 130 facing away from the light-emitting surface 112. The first prism rods 131 extend in the second extension direction ED2 (shown in FIG. 4), and the included angle A2 between the second extension direction ED2 and the light-incident surface 111 ranges from 0° to 30°. Please refer to FIGS. 1 and 5. The second prism sheet 140 is disposed beside the light-emitting surface 112, and the first prism sheet 130 is further disposed between the light-emitting surface 112 and the second prism sheet 140. The second prism sheet 140 includes a plurality of second prism rods 141 disposed on the side of the second prism sheet 140 facing away from the light-emitting surface 112. The second prism rod 141s extend in the third extension direction ED3 (shown in FIG. 5), and the included angle A3 between the third extension direction ED3 and the light-incident surface 111 ranges from 0° to 30°. It can be understood that the light source module 100 of this embodiment may be further provided with other prism sheets or optical films according to actual requirements. For example, a reflection sheet R (shown in FIG. 1) may be disposed on one side of the bottom surface 113 of the light guide plate 110 to improve light utilization.

The light source module 100 of this embodiment adopts the light guide plate 110, the first prism sheet 130 and the second prism sheet 140 to adjust the emitting direction of the light emitting from the light source module 100. In detail, after the light generated by the light-emitting element 120 enters the light guide plate 100, the aforementioned light can be output from the light source module 100 in a direction closer to the normal direction of the light-emitting surface 112 of the light guide plate 110 through adjusting the light path of the aforementioned light by the first surfaces S of the bottom microstructures 1130 and the first strip-shaped microstructures P1 and P2, wherein the normal direction is, for example, parallel to the direction Y in FIG. 1. In addition, after emitting from the light-emitting surface 112, the aforementioned light will be sequentially incident on the first prism sheet 130 and the second prism sheet 140, and the light path of the aforementioned light can be further adjusted by the first prism rods 131 of the first prism sheet 130 and the second prism rods 141 of the second prism sheet 140, so that the aforementioned light can be output in a direction closer to the normal direction of the light-emitting surface 112. Therefore, the light source module 100 can effectively improve the forward luminance. The detailed structures of the light guide plate 110, the light-emitting element 120, the first prism sheet 130 and the second prism sheet 140 will be described below.

Figure 6:
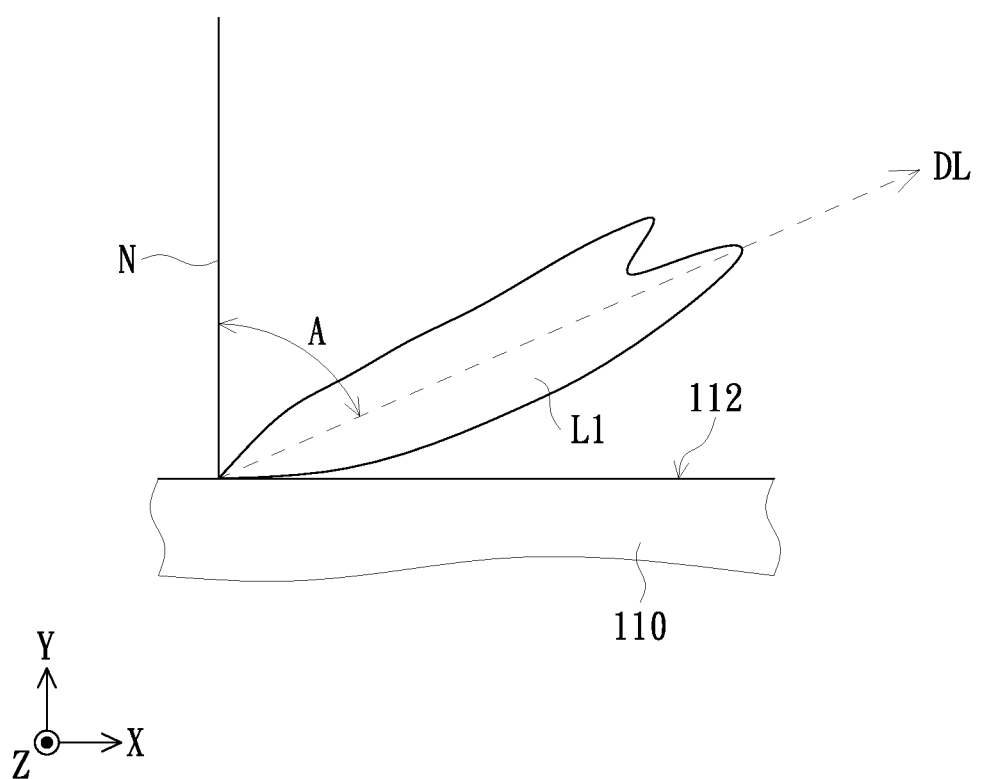
FIG. 6 is a schematic diagram of the light-emitting distribution of a light guide plate.
Figure 7:
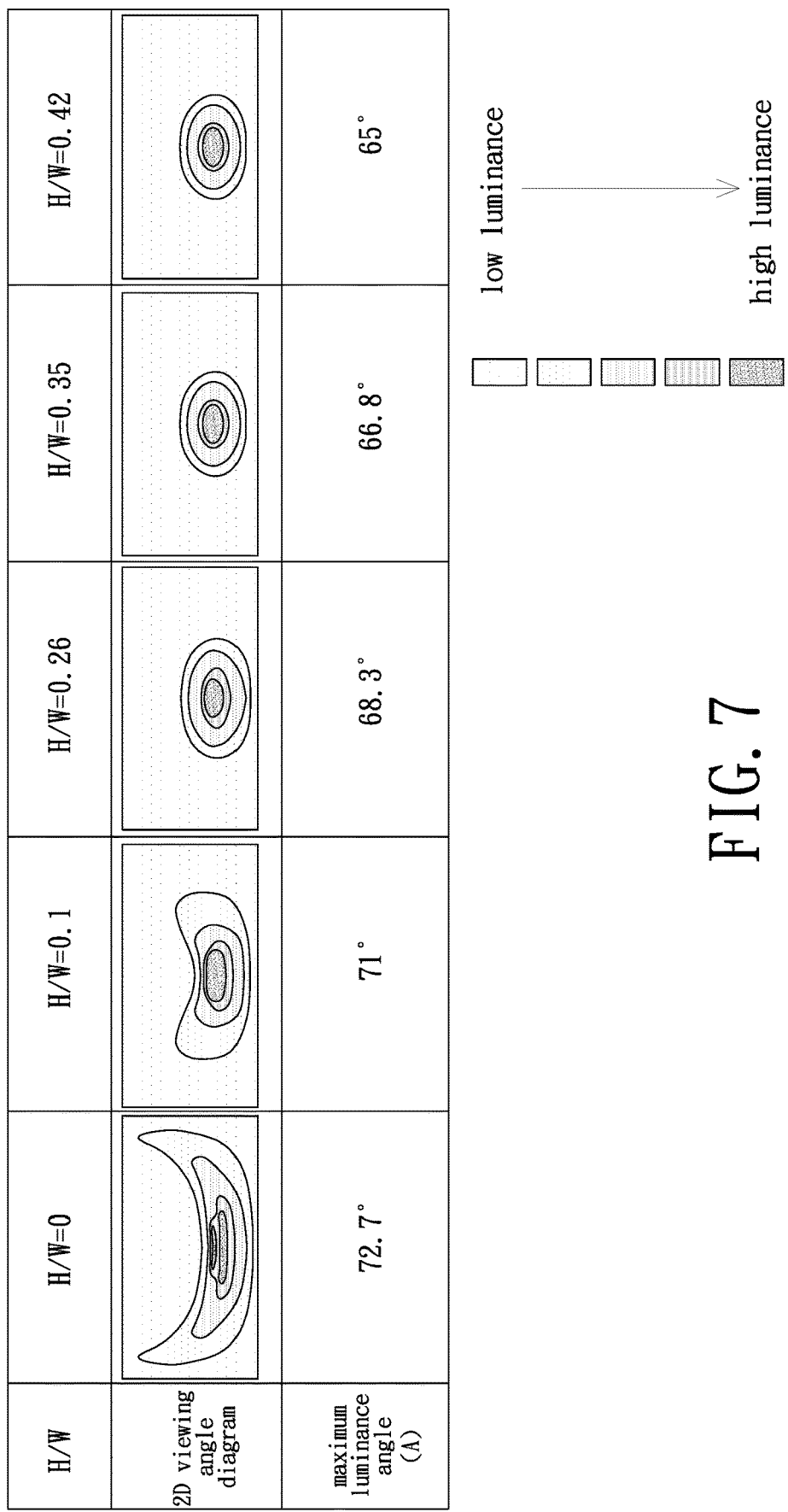
FIG. 7 is a schematic diagram of the light-emitting distribution and the maximum luminance angle of the light guide plate according to different embodiments of the present invention.

FIG. 6 is a schematic diagram of the light-emitting distribution (the relationship between the light-emitting direction and relative light intensity) of a light guide plate. FIG. 7 is a schematic diagram of the light-emitting distribution (viewing angle distribution) and the maximum luminance angle of the light guide plate according to different embodiments of the invention. FIG. 6 illustrates the viewing direction relationship with FIG. 1 in directions X, Y and Z. In FIG. 7, the 2D (two-dimensional) viewing angle diagram is the light intensity distribution diagram of the light-emitting surface 112 of the light guide plate 110. Please refer to FIGS. 1, 6 and 7 together. In different embodiments of FIG. 7, the angle A1 between the first surface S and the bottom surface 113 is set to 8°, but other embodiments are not limited thereto. The light emitted from the light-emitting surface 112 of the light guide plate 110 is represented by the light-emitting distribution L. The light-emitting distribution L has the maximum luminance direction DL of the maximum luminance value of the light, a maximum luminance angle A defined as the angle between the maximum luminance direction DL and the normal direction N of the light-emitting surface 112. H/W=0 means the embodiment in which the light source module 100 is not provided with the first strip-shaped microstructures P1 and P2, and the other embodiments are the embodiments in which the light source module 100 is only provided with the first strip-shaped microstructures P1 or P2 with different H/W. In detail, in the embodiment of H/W=0, the maximum luminance angle A is larger than that of the other four embodiments, which means that the light-emitting distribution L (the maximum luminance direction DL) of this embodiment deviates from the normal direction N, compared with other embodiments provided with the first stripe-shaped microstructures P1 or P2, so that the forward luminance in this embodiment is insufficient. In the four embodiments of H/W=0.1, H/W=0.26, H/W=0.35 and H/W=0.42, the maximum luminance angle A gradually decreases as H/W increases, which indicates that the light-emitting distribution L will gradually approach the normal direction N as H/W increases, thereby improving the forward luminance. Specifically, the maximum luminance angle A of the light guide plate 110 of the invention is less than 70°, so that the angle between a maximum light-emitting direction L1 of the light source module 100 and the normal direction of a light-emitting surface of the light source module 100 (e.g., the side surface of the second prism sheet 140 facing away from the light guide plate 110) is less than 5°, and the light emitted by the light-emitting element 120 has a backlight-emitting distribution when it is emitted from the second prism sheet 140. The backlight-emitting distribution has the light-emitting angle range BLA in the direction perpendicular to the light-incident surface 111 (i.e., the direction X), the light-emitting angle range BLA is less than 40°, the light-emitting angle range BLA is, for example, the angle range in which the light-emitting brightness is greater than 50% of the maximum brightness of the backlight output light (i.e., the full width at half maximum, FWHM), but the invention is not limited thereto. In other embodiments, the maximum luminance angle A is, for example, less than 65°, the angle between the maximum light-emitting direction L1 and the normal of the light-emitting surface of the light source module 100 is, for example, less than 3°, and the light-emitting angle range BLA is, for example, less than 35°.

Figure 8:
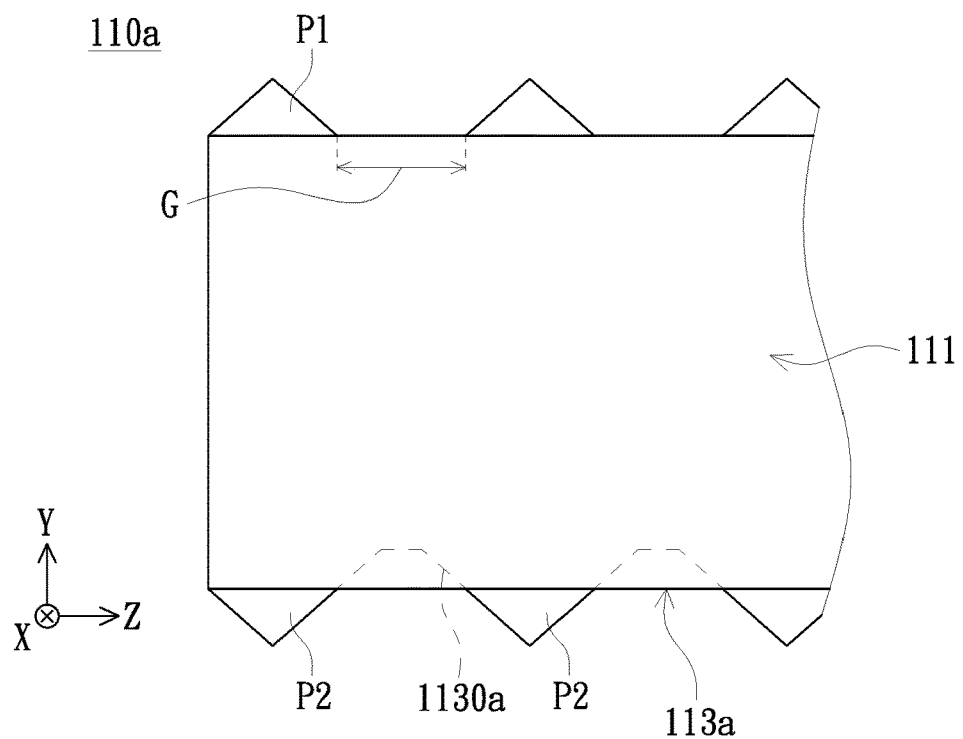
FIG. 8 is a partial enlarged schematic view of a light guide plate of a light source module according to another embodiment of the present invention.

Please refer to FIGS. 1 and 3 again. The material of the light guide plate 110 may include plastic, glass or other materials suitable for light transmission, but the invention is not limited thereto. In this embodiment (as shown in FIG. 1), the bottom microstructures 1130 are disposed on, for example, the first strip-shaped microstructures P2 located on the bottom surface 113 and are recessed toward the light guide plate 110, and the ridge line of the first strip-shaped microstructure P2 is, for example, parallel to the bottom surface 113 (i.e., the included angle A1 between the first surface S and the bottom surface 113 is equal to the included angle between the first surface S and the ridge line of the first strip-shaped microstructure P2, as shown in FIG. 1), but other embodiments are not limited thereto. For example, in another embodiment such as the light guide plate 110a shown in FIG. 8, the bottom microstructure 1130a can be disposed between any two adjacent first strip-shaped microstructures P2. That is, the bottom microstructures 1130a can be disposed on the bottom surface 113a. In addition, any two adjacent first strip-shaped microstructures P1 and P2 may have a space between them. For example, as shown in FIG. 8, there is a space G between the two adjacent first strip-shaped microstructures P1. It can be understood that the size of the space G shown in FIG. 8 is only for illustration, and the specific size of the space G can be adjusted according to actual needs, and the invention is not limited thereto.

Figure 9:
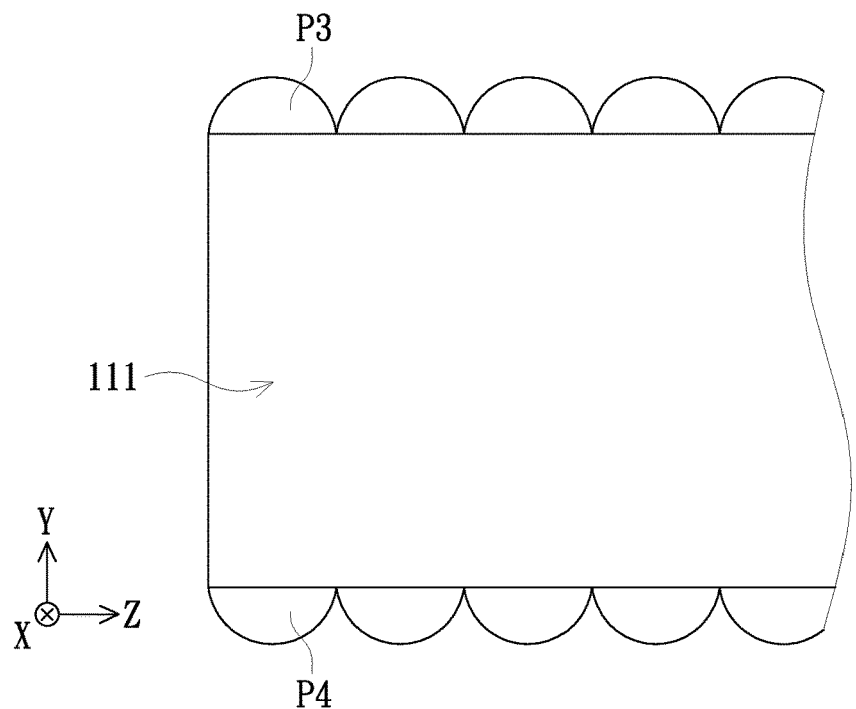
FIG. 9 is a partial enlarged schematic view of a light guide plate of a light source module according to another embodiment of the present invention.

Please refer to FIGS. 1 and 2 again. In this embodiment, the cross-sectional shapes of the first strip-shaped microstructures P1 and P2 parallel to the light-incident surface 111 may include triangles (as shown in FIG. 2), wherein the light-incident surface 111 is, for example, parallel to the Y-Z plane in this embodiment. However, in one embodiment as shown in FIG. 9, the cross-sectional shapes of the first strip-shaped microstructures P3 and P4 parallel to the light-incident surface 111 may include semicircle, but the invention is not limited thereto. For example, the cross-sectional shapes of the first strip-shaped microstructures P1 and P2 parallel to the light-incident surface 111 may include trapezoids or any polygons with tapered widths in another embodiment. Specifically, the width of the cross-sectional shape of the first strip-shaped microstructure parallel to the light-incident surface 111 decreases as away from the bottom surface 113 (or the light-emitting surface 112). Incidentally, in the embodiments of FIGS. 1 and 2, the first strip-shaped microstructures P2 disposed on the bottom surface 113 and the first strip-shaped microstructures P1 disposed on the light-emitting surface 112 may have the same cross-sectional shape. However, in other embodiments, the first strip-shaped microstructures P2 disposed on the bottom surface 113 and the first strip-shaped microstructures P1 disposed on the light-emitting surface 112 may have different cross-sectional shapes.

Figure 10:
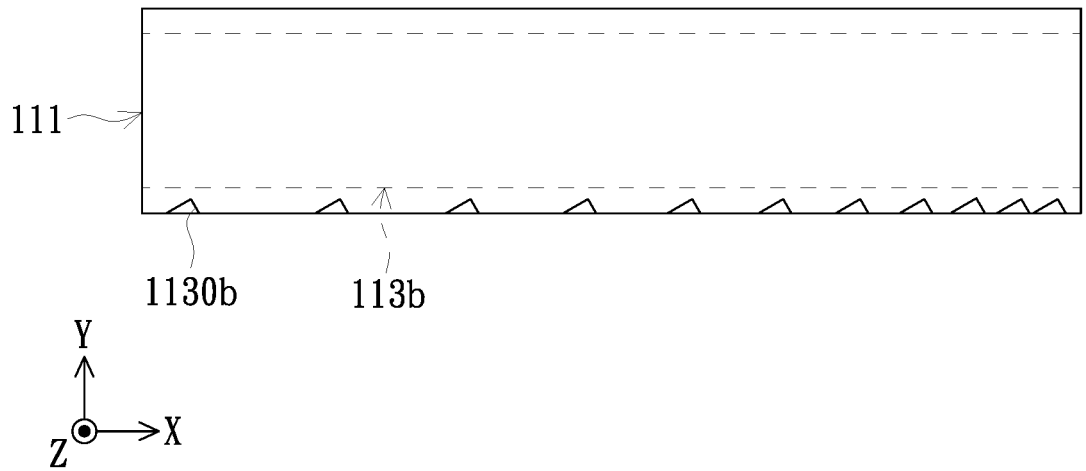
FIG. 10 is a schematic cross-sectional view of a light guide plate of a light source module according to another embodiment of the present invention.
Figure 11:
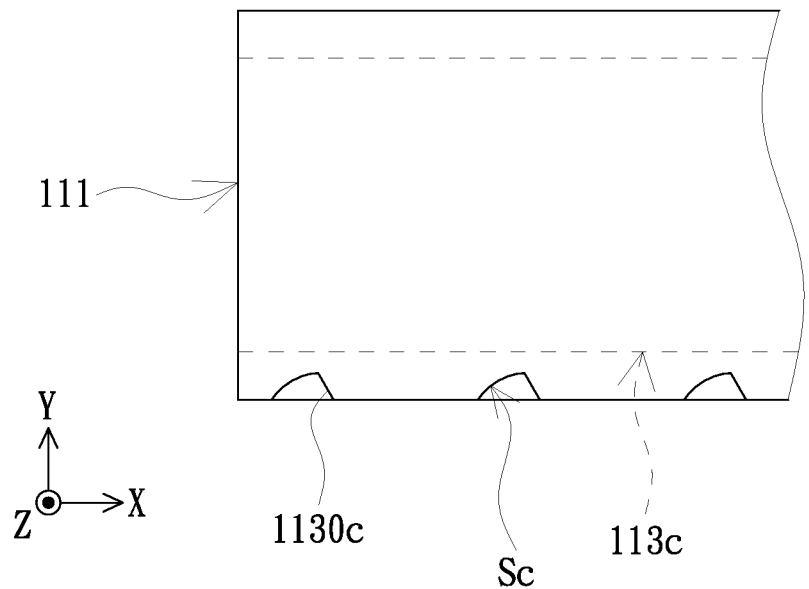
FIG. 11 is a partially enlarged schematic cross-sectional view of a light guide plate of a light source module according to another embodiment of the present invention.
Figure 12:
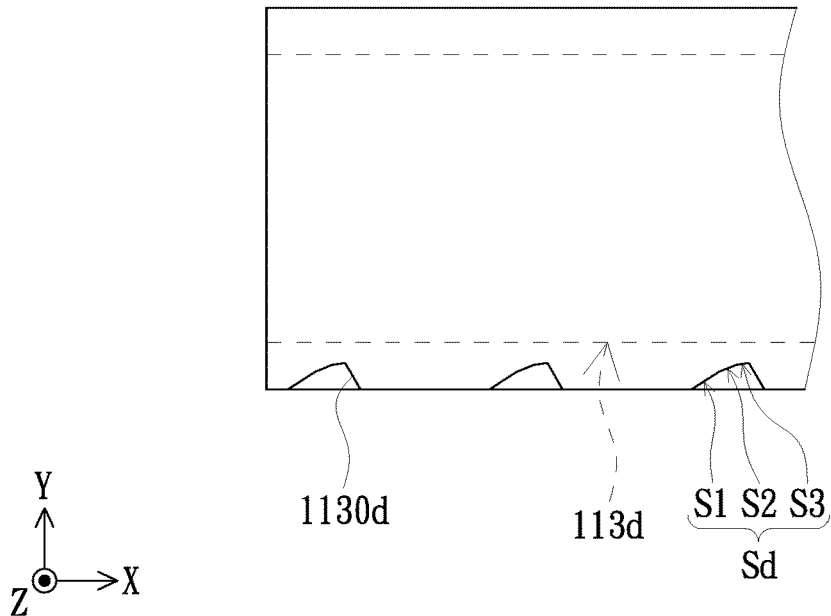
FIG. 12 is a partially enlarged schematic cross-sectional view of a light guide plate of a light source module according to another embodiment of the present invention.

Please refer to FIGS. 1 and 3 together again. The bottom microstructure 1130 in this embodiment can be recessed toward the light guide plate 110, so that the first surface S of the bottom microstructure 1130 faces the light-incident surface 111 of the light guide plate 110 for reflection the light generated by the light-emitting element 120. Specifically, as shown in FIG. 3, the bottom microstructure 1130 may be recessed from the top of the first strip-shaped microstructure P2, but other embodiments are not limited thereto. For example, the bottom microstructure 1130a is recessed from the bottom surface 113a in the embodiment of FIG. 8. In other embodiments, the plurality of bottom microstructures 1130 may protrude toward the outside of the light guide plate 110. Incidentally, the size of the bottom microstructures 1130 can be the same as each other, and the bottom microstructures 1130 can be distributed on the bottom surface 113 in a nearly uniform distribution (e.g., matrix distribution or random distribution). However, referring to the light guide plate 110b of FIG. 10, the distribution density of the bottom microstructures 1130b on the bottom surface 113b (or on the first strip-shaped microstructure P2) may gradually increase from the side close to the light-incident surface 111 to the side far from the light-incident surface 111. It can be understood that the specific distribution of the bottom microstructures 1130b on the bottom surface 113b can be changed according to actual requirements and is not limited to the above-mentioned embodiments. Refer to FIGS. 1 and 3 again. The first surface S in this embodiment is, for example, a plane, but other embodiments are not limited thereto. For example, in the partially enlarged cross-sectional view of a light guide plate 110c shown in FIG. 11, the first surface Sc of the bottom microstructure 1130c can be a curved surface, and the average angle between the curved surface and the bottom surface 113c can range from 1° to 17°. In addition, although FIG. 11 shows the first surface Sc with a convex curved surface, the first surface Sc can be a concave curved surface in other embodiments. In the partially enlarged schematic cross-sectional view of the light guide plate 110d shown in FIG. 12, the first surface Sd of the bottom microstructure 1130d is formed by, for example, a plurality of planes. For example, the first surface Sd of this embodiment can be formed by three planes S1, S2 and S3, and the acute angle between the planes S1, S2 and S3 and the bottom surface 113d may range from 1° to 17°. However, the first surface Sd can be serrated or stepped in other embodiments, and the invention does not limit the specific structure of the first surface Sd.

Please refer to FIGS. 1, 4 and 5 together. In this embodiment, the material of the first prism sheet 130 and the material of the second prism sheet 140 may include polycarbonate, polystyrene, polypropylene, polyethylene terephthalate, etc., but the invention is not limited thereto. The refractive index of at least one of the first prism sheet 130 and the second prism sheet 140 in this embodiment may be greater than or equal to 1.48, so as to further enhance the forward luminance of the light source module 100. For example, in one embodiment, the refractive index of at least one of the first prism sheet 130 and the second prism sheet 140 may be greater than or equal to 1.5, but the invention is not limited thereto. Please continue to refer to FIG. 4. The first prism rods 131 of this embodiment are, for example, arranged in the second arrangement direction AD2, and the second arrangement direction AD2 may not be parallel to the second extension direction ED2. FIG. 4 is an example in which the second arrangement direction AD2 is substantially perpendicular to the second extending direction ED2, but other embodiments are not limited thereto. Similarly, refer to FIG. 5 again. The second prism rods 141 of this embodiment may be arranged in the third arrangement direction AD3, and the third arrangement direction AD3 may not be parallel to the third extension direction ED3. FIG. 5 is an example in which the third arrangement direction AD3 is substantially perpendicular to the third extension direction ED3, but the invention is not limited thereto. It should be noted that the second extension direction ED2 of the first prism rod 131 is different from (may not be parallel to) the third extension direction ED3 of the second prism rod 141 in this embodiment. However, in other embodiments, the second extension direction ED2 may be the same as the third extension direction ED3, and the second extension direction ED2 and the third extension direction ED3 are not limited to the directions shown in FIGS. 4 and 5.

Figure 13:
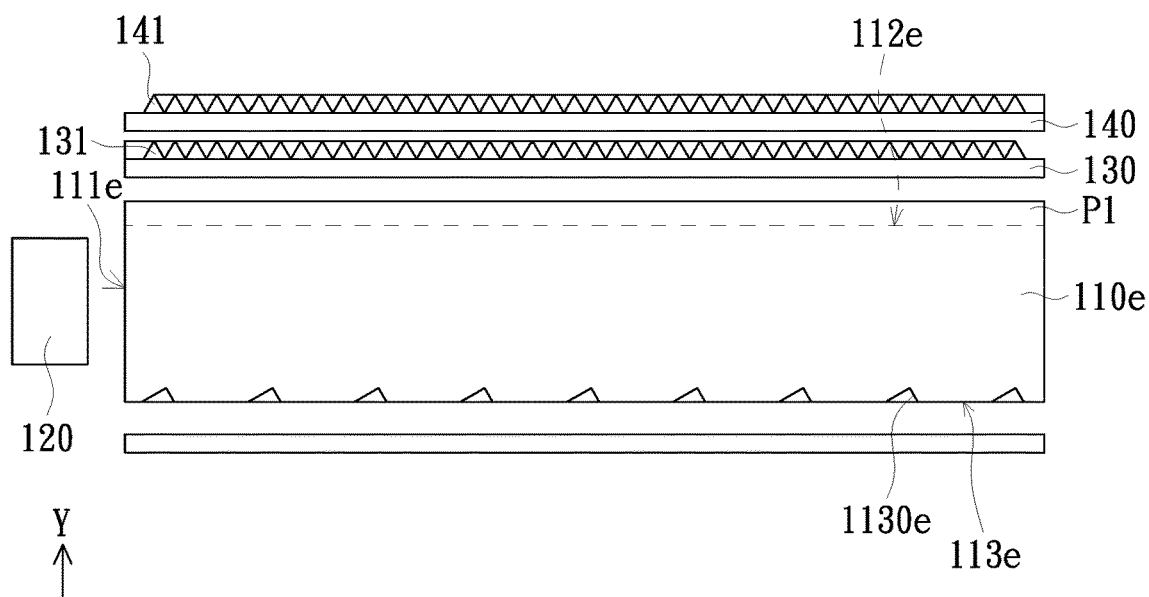
FIG. 13 is a schematic cross-sectional view of a light source module according to another embodiment of the present invention.
Figure 14:
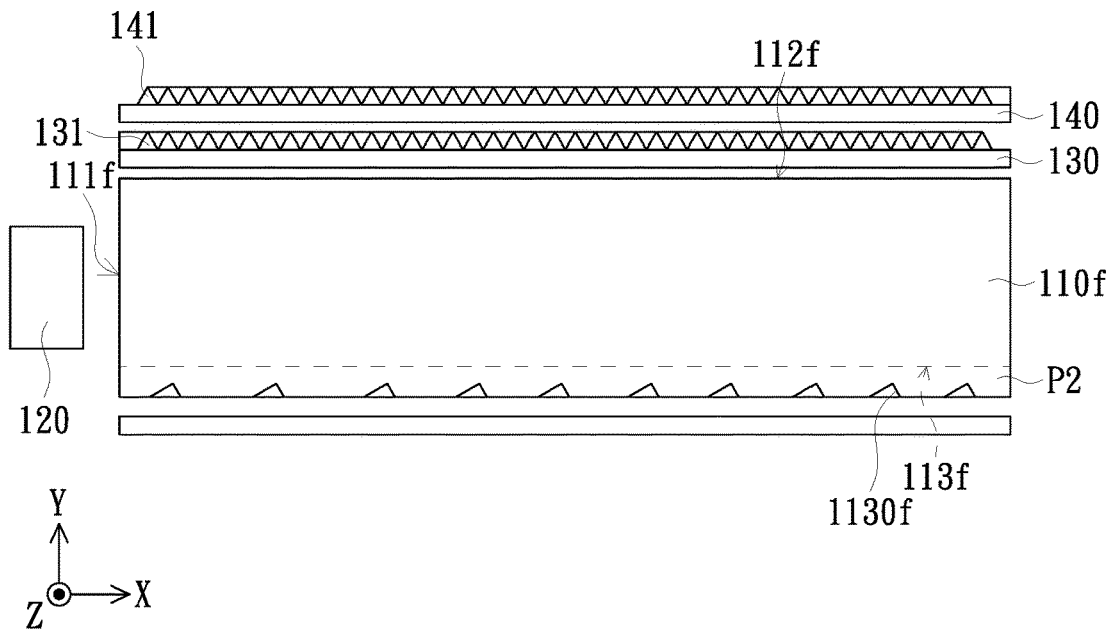
FIG. 14 is a schematic cross-sectional view of a light source module according to another embodiment of the present invention.

Incidentally, in the light source module 100e of FIG. 13, the light-emitting surface 112e of the light guide plate 110e has the first strip-shaped microstructures P1, and the bottom surface 113e does not have the first strip-shaped microstructures P2 in FIG. 1. In addition, the bottom microstructures 1130e in FIG. 13 are disposed on the bottom surface 113e. In another embodiment such as the light source module 100f of FIG. 14, the bottom surface 113f of the light guide plate 110f has the first strip-shaped microstructures P2, and the light-emitting surface 112f does not have the first strip-shaped microstructures P1 in FIG. 1. The bottom microstructures 1130f in FIG. 14 are disposed on the first strip-shaped microstructures P2 located on the bottom surface 113f.

Refer to FIG. 1 again. The light-emitting element 120 of this embodiment may include light-emitting diodes. The quantity of light-emitting diodes may be plural, and the light-emitting diodes are, for example, evenly distributed on one side of the light-incident surface 111. The luminous wavelength of the light-emitting diode may include blue light or white light, but the invention does not limit these detailed features. In addition, in this embodiment, the light-emitting element 120 is, for example, a packaged light-emitting chip, such as a packaged light-emitting diode chip. However, in other embodiments, the light-emitting element 120 may be an unpackaged light-emitting chip directly cut from a wafer, such as an unpackaged light-emitting diode chip. In addition, the aforementioned light-emitting diode chip is, for example, a grain-level nitride light-emitting diode chop that emits blue light at a dominant wavelength, but the present invention is not limited thereto.

Figure 15:
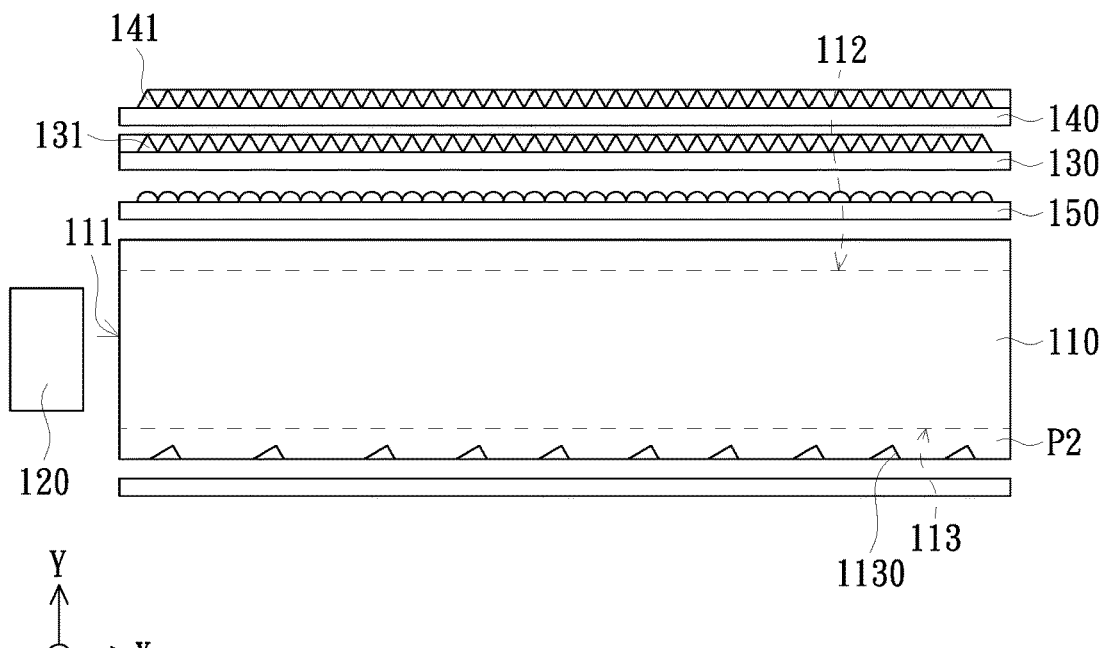
FIG. 15 is a schematic cross-sectional view of a light source module according to another embodiment of the present invention.

FIG. 15 is a schematic cross-sectional view of a light source module according to another embodiment of the present invention. The structure and advantages of this embodiment are similar to those of the embodiment in FIG. 1, and only the differences will be described below. Referring to FIG. 15, the light source module 100g may further include a diffusion sheet 150 disposed between the first prism sheet 130 and the light-emitting surface 112. The haze of the diffusion sheet 150 ranges from 20% to 95%. For example, the haze of the diffusion sheet 150 in this embodiment may range from 20% to 95%; the haze of the diffusion sheet 150 in one embodiment may range from 20% to 85%; and the haze of the diffusion sheet 150 in another embodiment may range from 20% to 75%. Incidentally, the diffusion sheet 150 in this embodiment may be provided with diffusion particles. In other embodiments, the diffusion sheet 150 may generate diffused light by roughening the surface, setting dots on the surface, or setting microstructures on the surface, etc. and the invention is not limited thereto.

Figure 16:
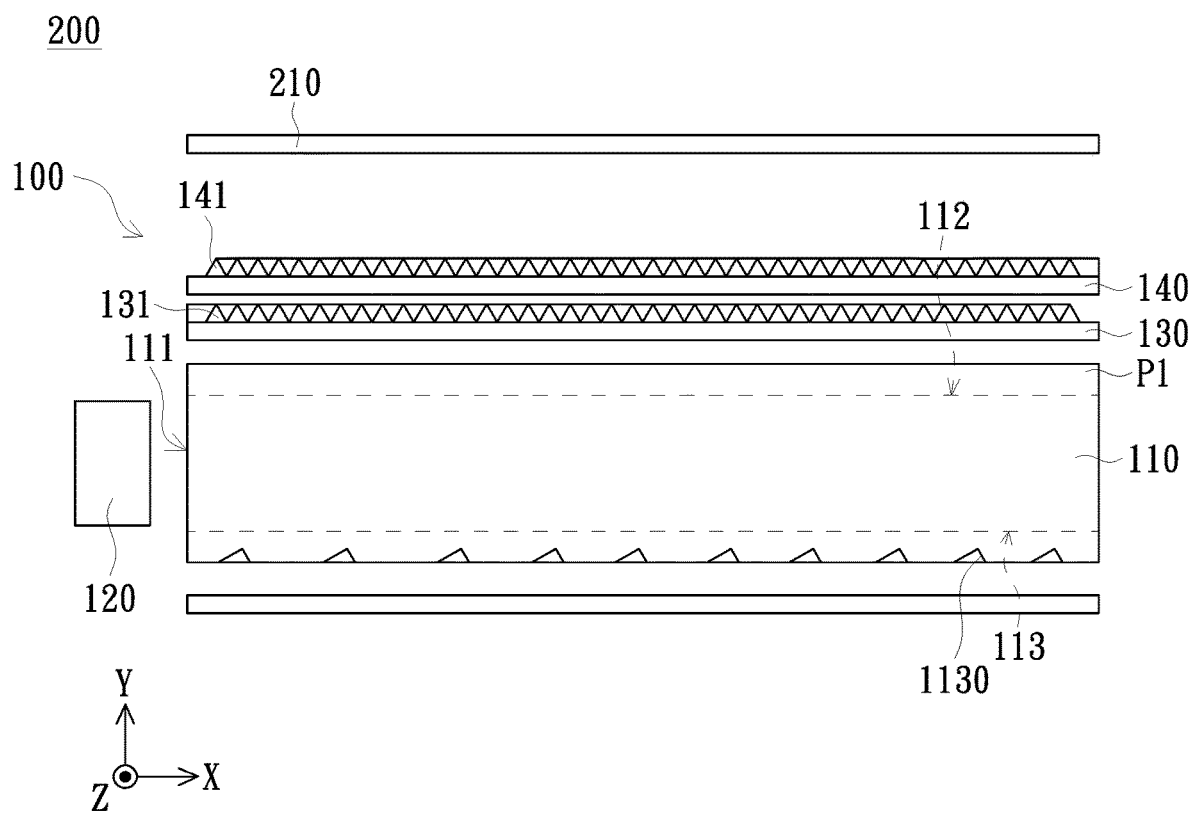
FIG. 16 is a schematic cross-sectional view of a display device according to an embodiment of the invention.

FIG. 16 is a schematic cross-sectional view of a display device according to an embodiment of the invention. Referring to FIG. 16, the display device 200 includes a light source module 100 and a display panel 210. The display panel 210 is disposed on the light-emitting side of the light source module 100. For example, the display panel 210 in this embodiment is disposed on the side of the second prism sheet 140 facing away from the first prism sheet 130, but the invention is not limited thereto. In this embodiment, the display panel 210 is, for example, a liquid crystal display panel or other types of display panels, and the light source module 100 is configured to provide illumination light to the display panel 210. It can be understood that the display device 200 of this embodiment can also adopt any light source module of the above-mentioned embodiments.

By adopting the light source module 100, the display device 200 of this embodiment can provide improved image quality, compared with the prior art.

In summary, the light source module of the present invention adopts the light guide plate, the first prism sheet and the second prism sheet to adjust the angle of the exiting light. In detail, after the light generated by the light-emitting element enters the light guide plate, the aforementioned light can be output in a direction closer to the normal direction of the light-emitting surface of the light guide plate through adjusting the light path of the aforementioned light by the bottom microstructures and the first strip-shaped microstructures. In addition, after emitting from the light-emitting surface, the aforementioned light will be incident on the first prism sheet and the second prism sheet, and the light path of the aforementioned light can be further adjusted by the first prism rods of the first prism sheet and the second prism rods of the second prism sheet, so that the aforementioned light can be output in a direction closer to the normal direction of the light-emitting surface. Therefore, the light source module of the present invention can effectively improve the forward luminance, and the display device having the aforementioned light source module can also improve the image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism sheet, the second prism sheet, the first prism rod, the second prism rod, the first extension direction, and the second extension direction are only used for distinguishing various elements and do not limit the number of the elements.

What is claimed is:

1. A light source module, comprising:
a light guide plate, having a light-incident surface, a light-emitting surface and a bottom surface, wherein the light-emitting surface is opposite to the bottom surface, the light-incident surface is connected to the light-emitting surface and the bottom surface, at least one of the light-emitting surface and the bottom surface has a plurality of first strip-shaped microstructures, the first strip-shaped microstructures extend from the light-incident surface in a first extension direction away from the light-incident surface and are arranged in a first arrangement direction, the first extension direction is not parallel to the first arrangement direction, the bottom surface has a plurality of bottom microstructures, each of the bottom microstructures has a first surface facing the light-incident surface, and an acute angle between the first surface and the bottom surface ranges from 1° to 17°;
a light-emitting element, disposed opposite to the light-incident surface of the light guide plate and configured to emit a light;
a first prism sheet, disposed beside the light-emitting surface, wherein the first prism sheet comprises a plurality of first prism rods disposed on a side of the first prism sheet facing away from the light-emitting surface, the first prism rods extend in a second extension direction, and an angle between the second extension direction and the light-incident surface ranges from 0° to 30°; and
a second prism sheet, disposed beside the light-emitting surface, wherein the first prism sheet is further disposed between the light-emitting surface and the second prism sheet, the second prism sheet comprises a plurality of second prism rods disposed on a side of the second prism sheet facing away from the light-emitting surface, the second prism rods extend in a third extension direction, and an angle between the third extension direction and the light-incident surface ranges from 0° to 30°,
wherein a ratio of a height of the first strip-shaped microstructure in a direction perpendicular to the light-emitting surface to a width of the first strip-shaped microstructure in a direction parallel to the first arrangement direction is greater than or equal to 0.2, a light-emitting distribution of the light emitted from the light-emitting surface of the light guide plate has a maximum luminance direction, an angle between the maximum luminance direction and the normal direction of the light-emitting surface of the light guide plate is less than 70°, the light emitted from the second prism sheet has a backlight light-emitting distribution, the backlight light-emitting distribution has a light-emitting angle range in a direction perpendicular to the light-incident surface, and the light-emitting angle range is less than 40°.

2. The light source module according to claim 1, wherein the first strip-shaped microstructures are disposed on the bottom surface, the bottom microstructures are respectively disposed on the first strip-shaped microstructures or disposed between any two adjacent first strip-shaped microstructures.

3. The light source module according to claim 1, wherein a space is formed between any two adjacent first strip-shaped microstructures.

4. The light source module according to claim 1, wherein the bottom microstructures extend toward the light guide plate.

5. The light source module according to claim 1, wherein the bottom microstructures have a same size and are randomly distributed on the bottom surface.

6. The light source module according to claim 1, wherein cross-sectional shapes of the first strip-shaped microstructures in a direction parallel to the light-incident surface comprise semicircles, triangles, trapezoids or arbitrary polygons.

7. The light source module according to claim 1, wherein a refractive index of at least one of the first prism sheet and the second prism sheet is greater than or equal to 1.48.

8. The light source module according to claim 1, wherein the first surface is a plane, formed by a plurality of planes, or a curved surface.

9. The light source module according to claim 1, further comprising a diffusion sheet, disposed between the first prism sheet and the light-emitting surface, wherein a haze of the diffusion sheet ranges from 20% to 95%.

10. A display device, comprising:
a light source module, comprising:
- a light guide plate, having a light-incident surface, a light-emitting surface and a bottom surface, wherein the light-emitting surface is opposite to the bottom surface, the light-incident surface is connected to the light-emitting surface and the bottom surface, at least one of the light-emitting surface and the bottom surface has a plurality of first strip-shaped microstructures, the first strip-shaped microstructures extend from the light-incident surface in a first extension direction away from the light-incident surface and are arranged in a first arrangement direction, the first extension direction is not parallel to the first arrangement direction, the bottom surface has a plurality of bottom microstructures, each of the bottom microstructures has a first surface facing the light-incident surface, and an acute angle between the first surface and the bottom surface ranges from 1° to 17°;
- a light-emitting element, disposed opposite to the light-incident surface of the light guide plate and configured to emit a light;
- a first prism sheet, disposed beside the light-emitting surface, wherein the first prism sheet comprises a plurality of first prism rods disposed on a side of the first prism sheet facing away from the light-emitting surface, the first prism rods extend in a second extension direction, and an angle between the second extension direction and the light-incident surface ranges from 0° to 30°; and
- a second prism sheet, disposed beside the light-emitting surface, wherein the first prism sheet is further disposed between the light-emitting surface and the second prism sheet, the second prism sheet comprises a plurality of second prism rods disposed on a side of the second prism sheet facing away from the light-emitting surface, the second prism rods extend in a third extension direction, and an angle between the third extension direction and the light-incident surface ranges from 0° to 30°,
wherein a ratio of a height of the first strip-shaped microstructure in a direction perpendicular to the light-emitting surface to a width of the first strip-shaped microstructure in a direction parallel to the first arrangement direction is greater than or equal to 0.2, a light-emitting distribution of the light emitted from the light-emitting surface of the light guide plate has a maximum luminance direction, an angle between the maximum luminance direction and the normal direction of the light-emitting surface of the light guide plate is less than 70°, the light emitted from the second prism sheet has a backlight light-emitting distribution, the backlight light-emitting distribution has a light-emitting angle range in a direction perpendicular to the light-incident surface, and the light-emitting angle range is less than 40°; and
a display panel, disposed on a light-emitting side of the light source module.

* * * * *